United States Patent
Urabe et al.

(10) Patent No.: US 10,084,357 B2
(45) Date of Patent: Sep. 25, 2018

(54) MOLDED STATOR, MOLDED ELECTRIC MOTOR, AND AIR CONDITIONER

(71) Applicant: Mitsubishi Electric Corporation, Tokyo (JP)

(72) Inventors: Yuto Urabe, Tokyo (JP); Hiroki Aso, Tokyo (JP); Kazunori Sakanobe, Tokyo (JP); Mineo Yamamoto, Tokyo (JP); Hiroyuki Ishii, Tokyo (JP); Junichiro Oya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 114 days.

(21) Appl. No.: 15/026,273

(22) PCT Filed: Oct. 22, 2013

(86) PCT No.: PCT/JP2013/078620
§ 371 (c)(1),
(2) Date: Mar. 31, 2016

(87) PCT Pub. No.: WO2015/059775
PCT Pub. Date: Apr. 30, 2015

(65) Prior Publication Data
US 2016/0261164 A1 Sep. 8, 2016

(51) Int. Cl.
*H02K 5/22* (2006.01)
*H02K 29/08* (2006.01)
(Continued)

(52) U.S. Cl.
CPC .............. *H02K 5/225* (2013.01); *F25D 17/06* (2013.01); *H02K 3/522* (2013.01); *H02K 5/02* (2013.01);
(Continued)

(58) Field of Classification Search
CPC .......... H02K 5/22; H02K 11/21; H02K 15/02; H02K 15/08; H02K 5/02; H02K 29/08; H02K 3/522; H02K 5/225; F25D 17/06
(Continued)

(56) References Cited

U.S. PATENT DOCUMENTS 9,568,012 B2 * 2/2017 Aso ........................ F04D 13/064
9,698,655 B2 * 7/2017 Urabe .................. H02K 11/042
(Continued)

FOREIGN PATENT DOCUMENTS

| | | |
|---|---|---|
| JP | H05-015096 A | 1/1993 |
| JP | H11-178270 A | 7/1999 |

(Continued)

OTHER PUBLICATIONS

JPO machine translation of JP 2010273525 A, all pages, Yamamoto, Mineo.*

(Continued)

*Primary Examiner* — Naishadh Desai
(74) *Attorney, Agent, or Firm* — Posz Law Group, PLC

(57) ABSTRACT

The present invention is a molded stator including a stator and a substrate. The molded stator includes: a donut-shaped lead-wire wiring component that wires power-supply lead wires to a winding wire of the stator and that wires sensor lead wires to the position detection circuit; a lead-out component that leads out the power-supply lead wires and the sensor lead wires to outside of the molded stator; a power-supply lead-wire holding component that holds the power-supply lead wires; and a sensor-lead-wire holding component that holds the sensor lead wires. The lead-out component is connected to a latching part that latches the sensor-lead-wire holding component and includes projections as plane parts that are substantially perpendicular to a radial direction of the stator on the radially outer side.

7 Claims, 14 Drawing Sheets

(51) Int. Cl.
| | |
|---|---|
| H02K 3/52 | (2006.01) |
| H02K 11/21 | (2016.01) |
| F25D 17/06 | (2006.01) |
| H02K 5/02 | (2006.01) |
| H02K 15/02 | (2006.01) |
| H02K 15/08 | (2006.01) |

(52) U.S. Cl.
CPC ............ *H02K 11/21* (2016.01); *H02K 15/02* (2013.01); *H02K 15/08* (2013.01); *H02K 29/08* (2013.01)

(58) Field of Classification Search
USPC ...................................................... 310/43, 71
See application file for complete search history.

(56) References Cited

U.S. PATENT DOCUMENTS

| | | | | |
|---|---|---|---|---|
| 9,705,375 | B2 * | 7/2017 | Yamamoto | ............. H02K 29/08 |
| 2001/0006312 | A1 * | 7/2001 | Sheeran | ................... H02K 3/50 310/71 |
| 2009/0026860 | A1 | 1/2009 | Ohuchi et al. | |
| 2015/0121948 | A1 * | 5/2015 | Urabe | ................... F04D 13/064 62/498 |
| 2015/0159656 | A1 * | 6/2015 | Urabe | ................... F04D 13/064 165/104.31 |

FOREIGN PATENT DOCUMENTS

| | | | |
|---|---|---|---|
| JP | 2007-228667 | A | 9/2007 |
| JP | 2007228667 | A * | 9/2007 |
| JP | 2009-112067 | A | 5/2009 |
| JP | 2010-220430 | A | 9/2010 |
| JP | 2010-273525 | A | 12/2010 |
| JP | 2010273525 | A * | 12/2010 |
| WO | 2011/055922 | A2 | 5/2011 |
| WO | 2014/132363 | A1 | 9/2014 |
| WO | 2014/132364 | A1 | 9/2014 |

OTHER PUBLICATIONS

Office Action dated Apr. 20, 2017 issued in corresponding KR patent application No. 10-2016-7012589 (and partial English translation).

Office Action dated Aug. 9, 2016 issued in corresponding JP patent application No. 2015-543633 (with English Translation).

Office Action dated Nov. 8, 2016 issued in corresponding AU patent application No. 2013403563.

International Search Report of the International Searching Authority dated Jan. 21, 2014 for the corresponding International application No. PCT/JP2013/078620 (and English translation).

Extended European Search Report dated Jun. 8, 2017 issued in corresponding EP patent application No. 13896055.4.

Office Action dated Mar. 5, 2018 issued in corresponding CN patent application No. 201380080318.9 (and English translation).

* cited by examiner

MOLDED STATOR, MOLDED ELECTRIC MOTOR, AND AIR CONDITIONER

CROSS REFERENCE TO RELATED APPLICATION

This application is a U.S. national stage application of PCT/JP2013/078620 filed on Oct. 22, 2013, the contents of which are incorporated herein by reference.

FIELD

The present invention relates to a molded stator, a molded electric motor, and an air conditioner.

BACKGROUND

It is conventional to install a molded electric motor as a fan motor in the indoor-device or the outdoor-device of an air conditioner. In a molded electric motor, a stator is molded from mold resin to form an outer frame thereof, and a rotor is placed movably on an inner periphery side of the outer frame. In the molded electric motor, a wire lead-out component for drawing a lead wire from the stator or a wiring substrate to the outside is provided. The wire lead-out component is integrally molded with the stator and wiring components from mold resin.

However, with this type of configuration, ingress of fluid tends to occur through a gap or an interface between the outer frame of the molded electric motor and the wire lead-out component or through a gap or an interface between the wire lead-out component and the lead wire. Therefore, heretofore, there has been a problem in that it is necessary to perform secondary processing such as the application of a sealing material or attachment of tape, which is measures of ensuring the molded electric motor, has waterproof properties.

A conventional electric motor described in Patent Literature 1 listed below includes a lead-wire wiring component so that fluid does not reach a substrate after mold forming the stator. A substrate on which electronic components are mounted can be assembled to the lead-wire wiring component, and the lead-wire wiring component is placed in the stator. Further, the lead-wire wiring component is configured to draw a power-supply lead wire that supplies power to the stator and a sensor lead wire that supplies power as well as positional information of a rotor to a substrate.

Furthermore, in a conventional electric motor described in Patent Literature 2 listed below, a stator is molded from mold resin to form an outer frame thereof, and a bushing (lead-out unit) that draws a lead wire out from an outer frame of a molded electric motor is integrally molded with the outer frame. This electric motor is characterized such that the bushing (lead-out unit) is an elastic body, the bushing (lead-out unit) is molded, and the bushing is compressed by the outer frame, thereby reducing ingress of fluid from the lead-out unit.

CITATION LIST

Patent Literatures

Patent Literature 1: Japanese Patent Application Laid-open No. 2010-273525
Patent Literature 2: Japanese Patent Application Laid-open No. 2009-112067

SUMMARY

Technical Problem

However, in the stator of the conventional molded electric motor described in Patent Literature 1 listed above, a wire lead-out unit is integrally formed with the lead-wire wiring component, and is placed on an outer periphery side of a stator core. Therefore, a connection part is formed between the wire lead-out unit and the lead-wire wiring component; and an interface between the connection part and a mold material becomes a path for ingress of fluid. Therefore, the connection part becomes a path for ingress of fluid having entered from the wire lead-out unit; and the fluid reaches the substrate and the stator. When the fluid reaches the substrate, the fluid is accumulated in a space between the power-supply lead wire and the substrate; and when power is turned on to the substrate, pattern corrosion of the substrate occurs and pattern breakage occurs. Due to this occurrence of pattern breakage, there is a problem in that detection of the position of the rotor becomes difficult, and there is a possibility that the electric motor becomes inoperable. Further, there is a possibility that, when the wire lead-out unit and the lead-wire wiring component are separated, positioning of the wire lead-out unit becomes unstable.

Furthermore, in the stator of the conventional molded electric motor described in Patent Literature 2 listed above, because the material of the bushing is an elastic body, there has been a problem related to the environment resistance under severe environments such as degradation of the bushing material.

The present invention has been achieved in view of the above problems, and an objective of the present invention is to provide a molded stator, a molded electric motor, and an air conditioner that can achieve further improvement in quality.

Solution to Problem

In order to solve the problem and achieve the objective mentioned above, the present invention relates to a molded stator that includes a stator and a substrate having a position detection circuit of a rotor mounted thereon and an outer frame thereof being formed from mold resin. The molded stator includes a donut-shaped lead-wire wiring component that is attached to an end of the stator in the axial direction, wires power-supply lead wires to a winding wire of the stator, and wires sensor lead wires to the position detection circuit; a lead-out component that is provided on a radially outer side of the lead-wire wiring component and leads out the power-supply lead wires and the sensor lead wires to outside of the molded stator; a power-supply lead-wire holding component that is assembled to the lead-out component and holds the power-supply lead wires; and a sensor-lead-wire holding component that is assembled to the lead-out component and holds the sensor lead wires. The lead-out component is connected to a latching part that latches to the sensor-lead-wire holding component, and includes plane parts, on the radially outer side, that are substantially perpendicular to a radial direction of the stator.

Advantageous Effects of Invention

With the molded stator of the present invention, because the molding pressure on a lead-out component during molding is increased, the lead-out component is pressed in a radial direction with a greater force so as to come into contact with the molding die so that the positioning in the radial direction can be made.

DESCRIPTION OF EMBODIMENTS

Exemplary embodiments of a molded stator, a molded electric motor, and an air conditioner according to the present invention will be explained below in detail with reference to the accompanied drawings. The present invention is not limited to these embodiments.

Embodiment

Figure 1:
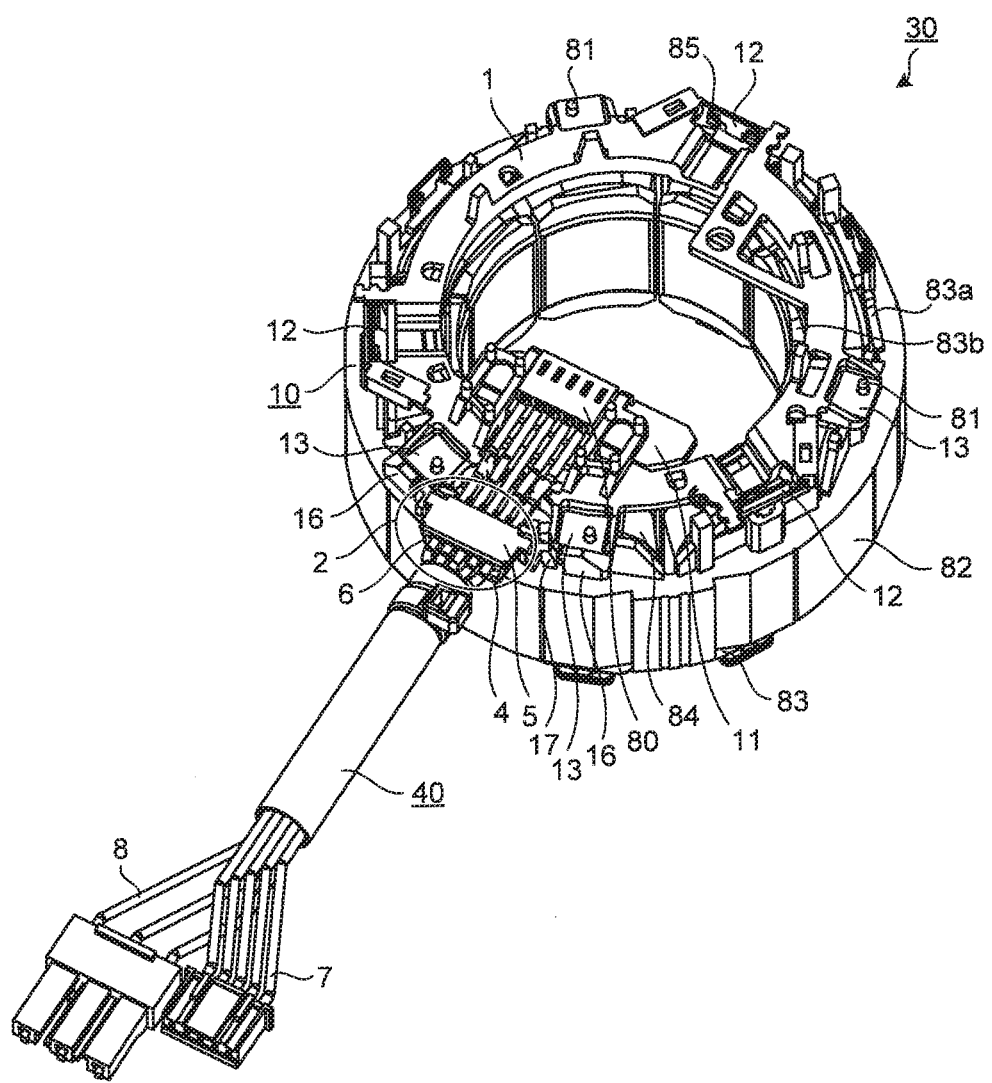
FIG. 1 is a perspective view of a stator assembly of an electric motor according to an embodiment of the present invention as viewed from a substrate side.
Figure 2:
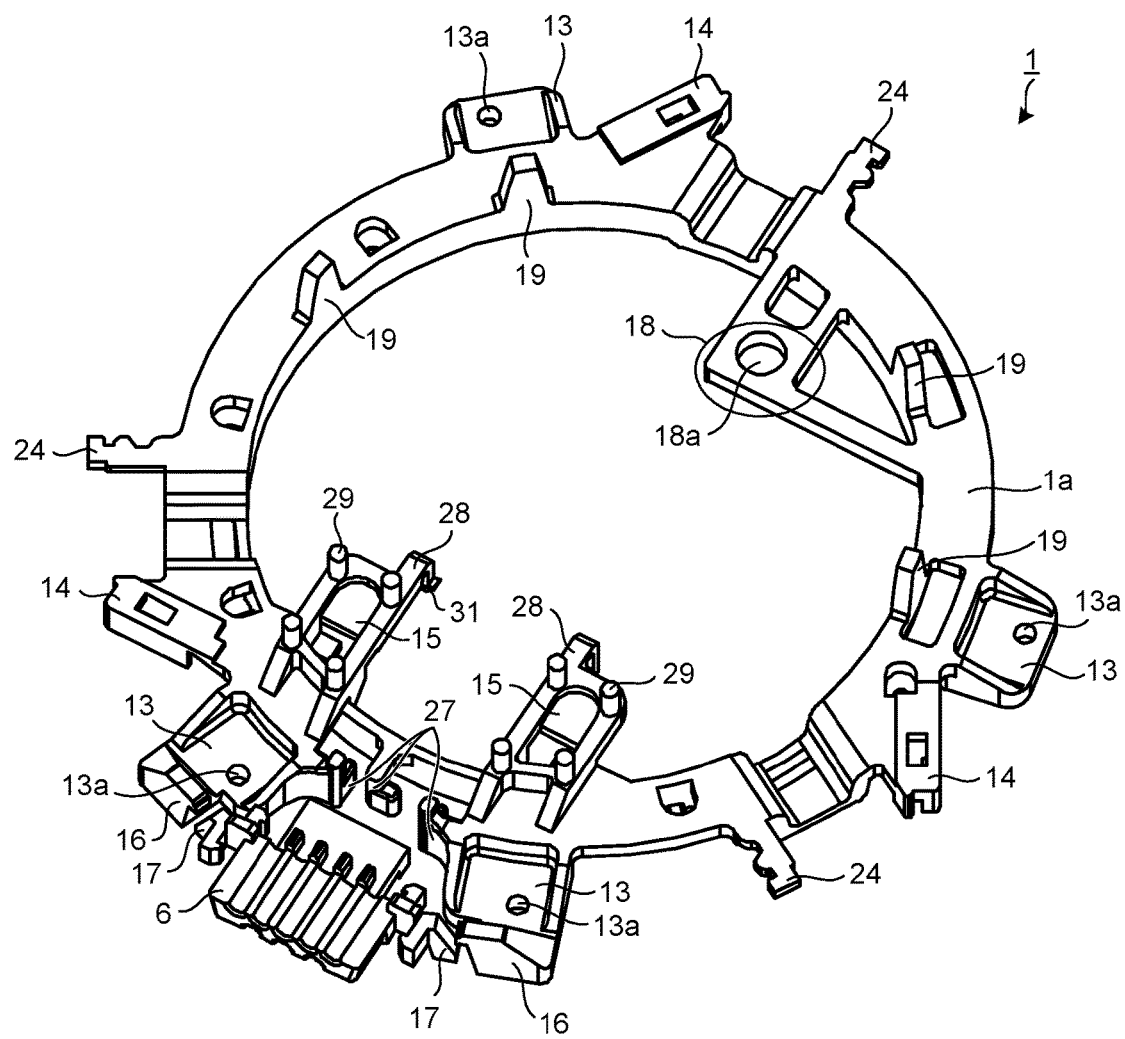
FIG. 2 is a perspective view of a lead-wire wiring component.
Figure 3:
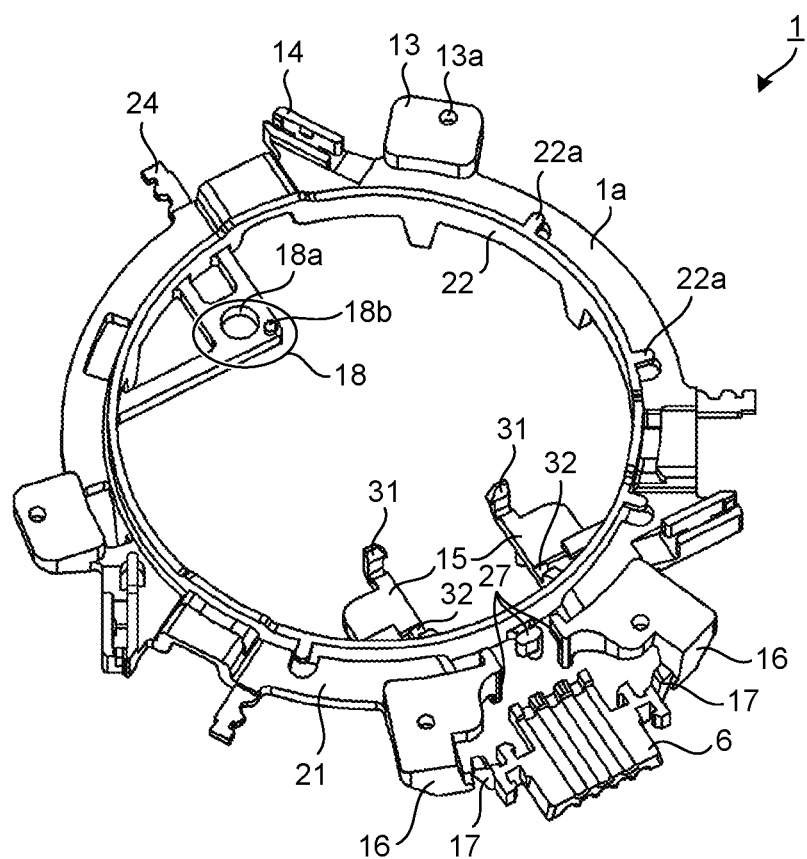
FIG. 3 is a perspective view of the lead-wire wiring component illustrated in FIG. 2 as viewed from an opposite surface.
Figure 4:
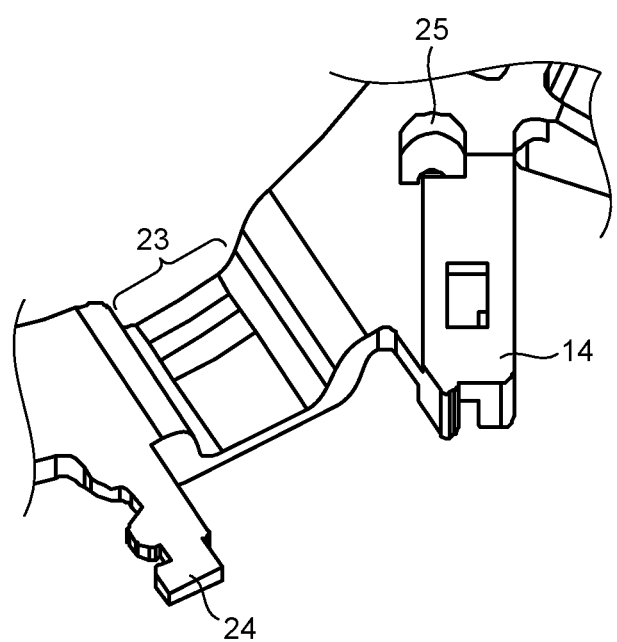
FIG. 4 is an enlarged view of a lead-wire terminal holding unit.
Figure 5:
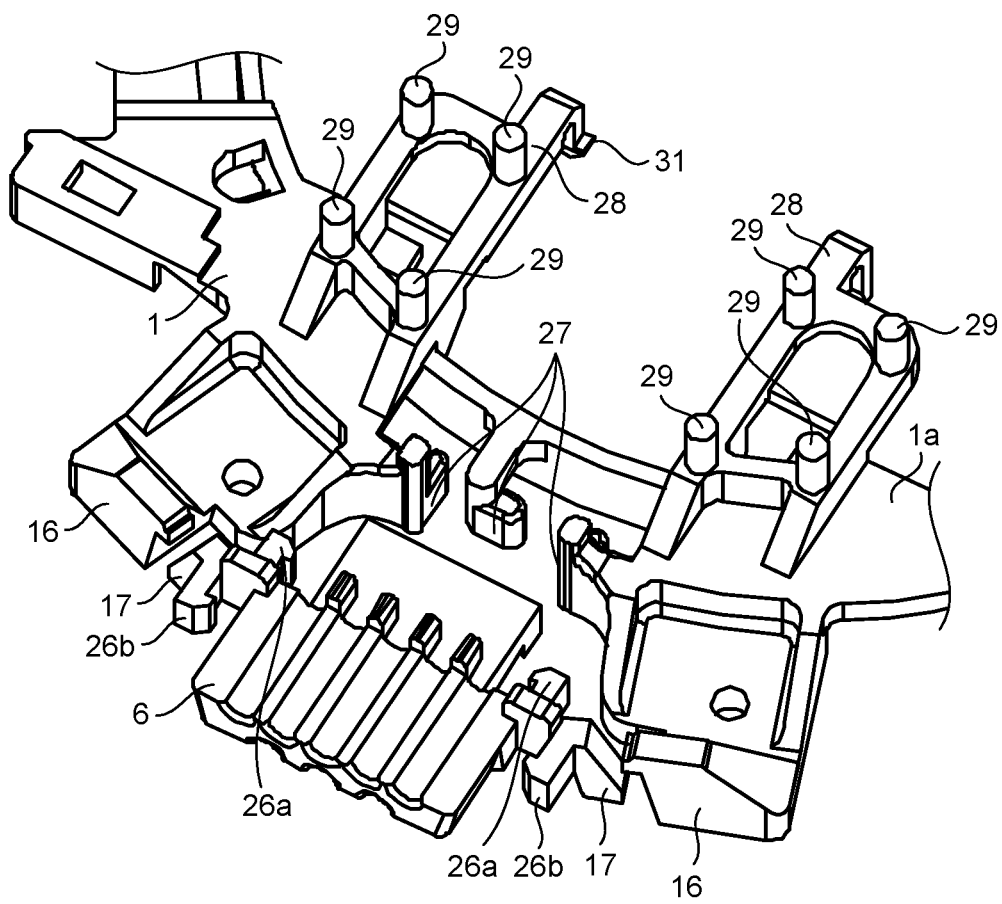
FIG. 5 is an enlarged view of a lead-out component and the periphery thereof.
Figure 6:
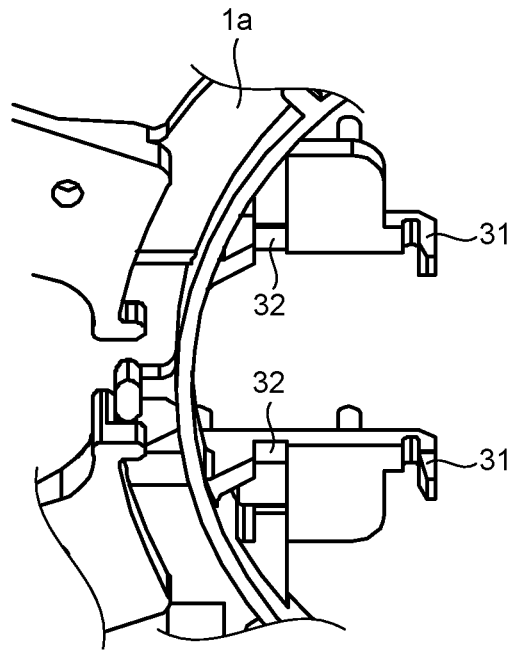
FIG. 6 is an enlarged view of a substrate holding unit and the periphery thereof.
Figure 7:
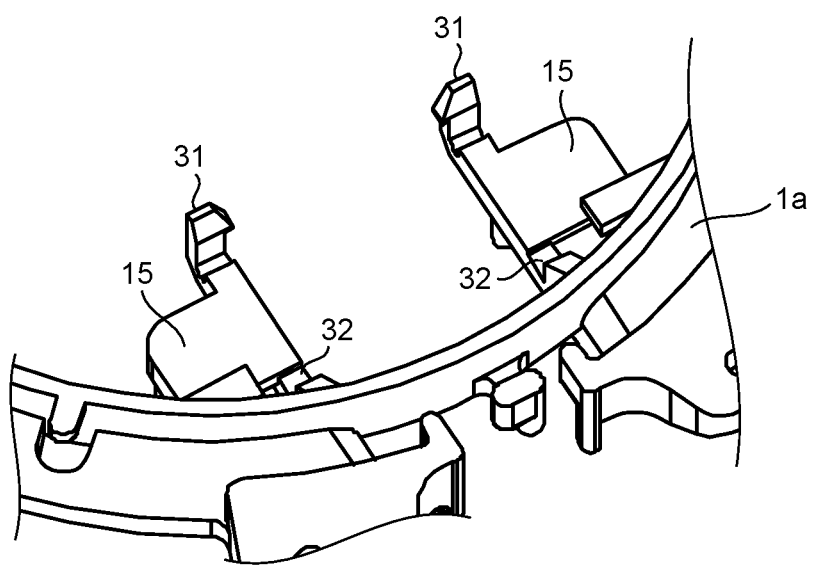
FIG. 7 is an enlarged view of the substrate holding unit and the periphery thereof.
Figure 8:
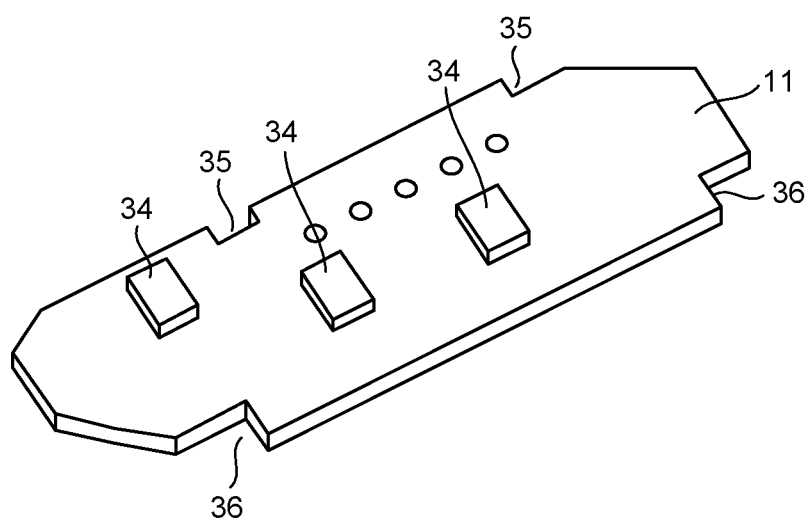
FIG. 8 is a perspective view of a sensor substrate.
Figure 9:
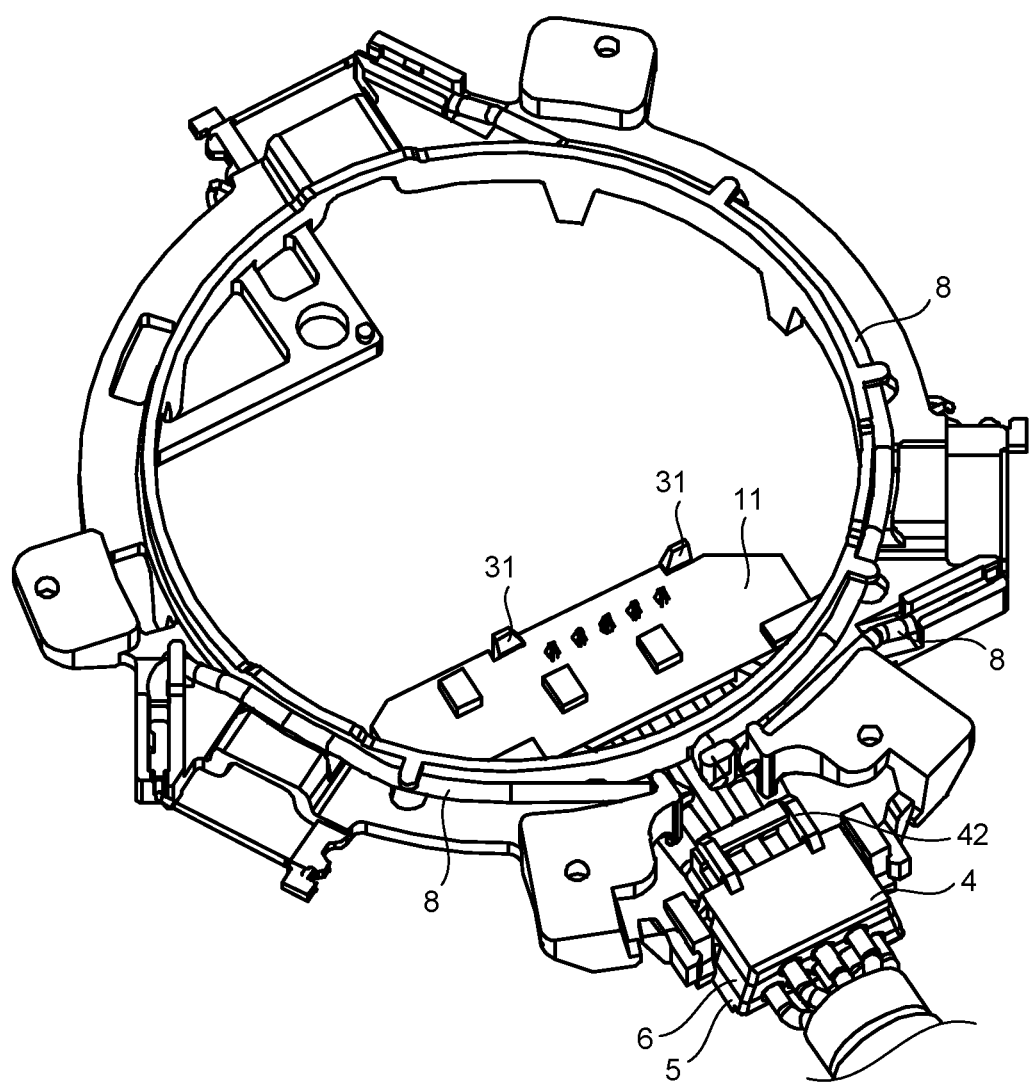
FIG. 9 is a perspective view of a lead-wire wiring component in a state where power-supply lead wires are in place.
Figure 10:
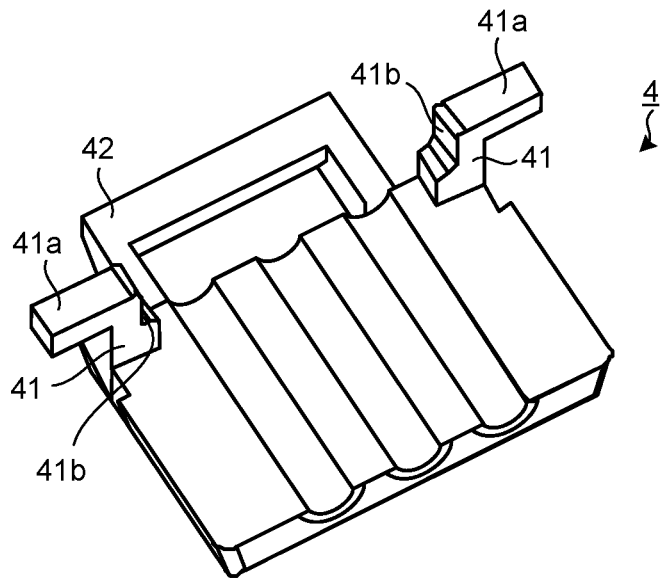
FIG. 10 is a perspective view of a power-supply lead-wire holding unit.
Figure 11:
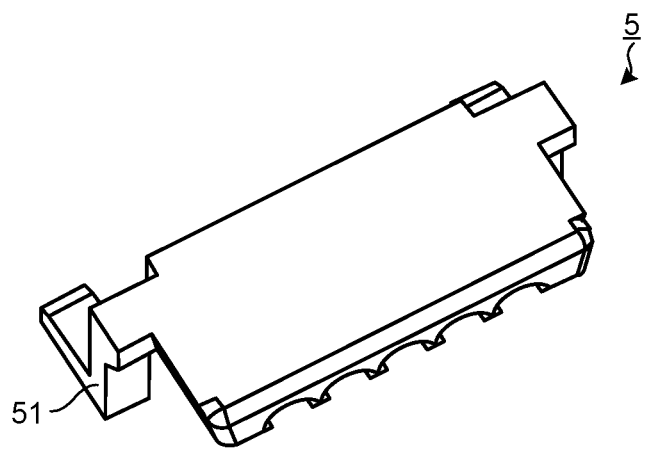
FIG. 11 is a perspective view of a sensor-lead-wire holding unit.
Figure 12:
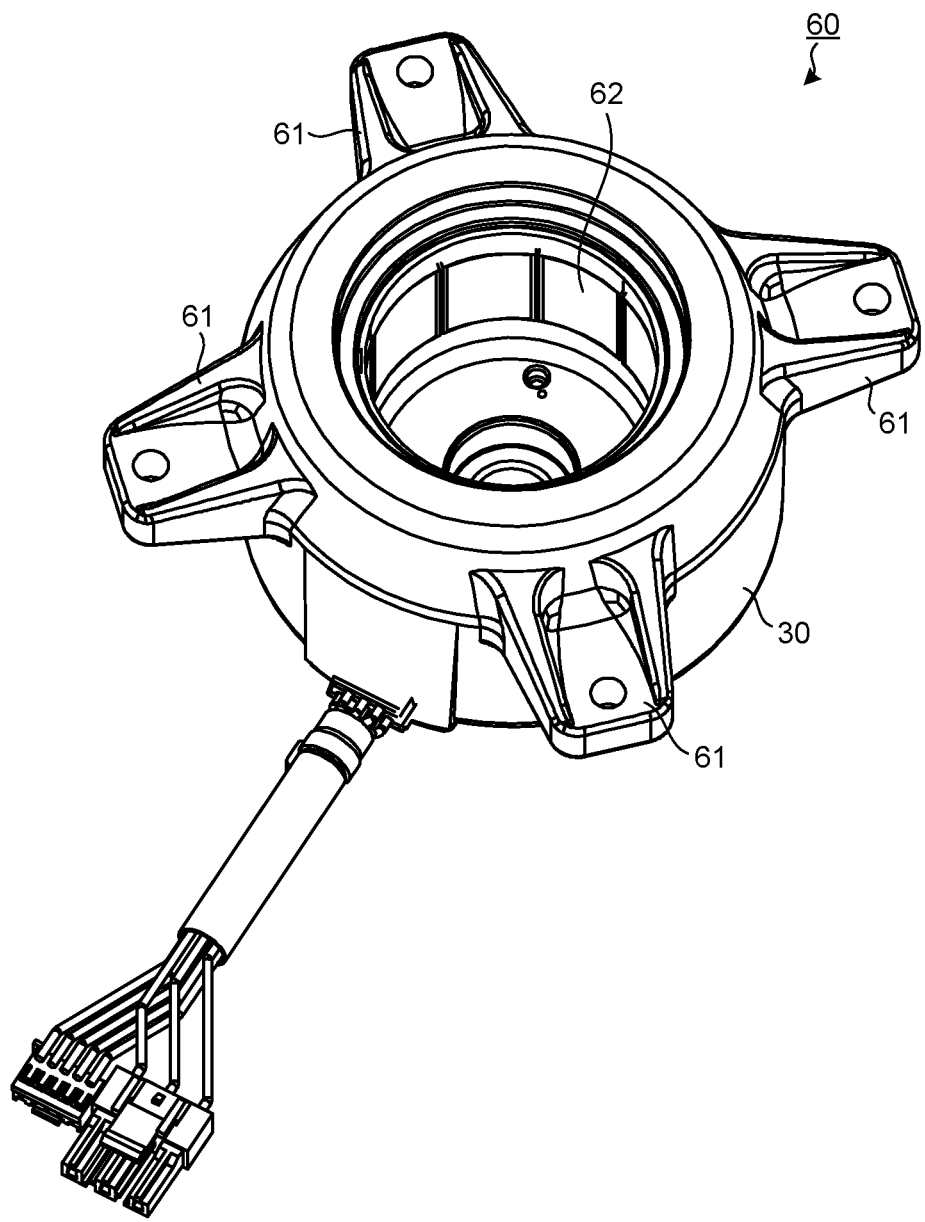
FIG. 12 is a perspective view of a molded stator.
Figure 13:
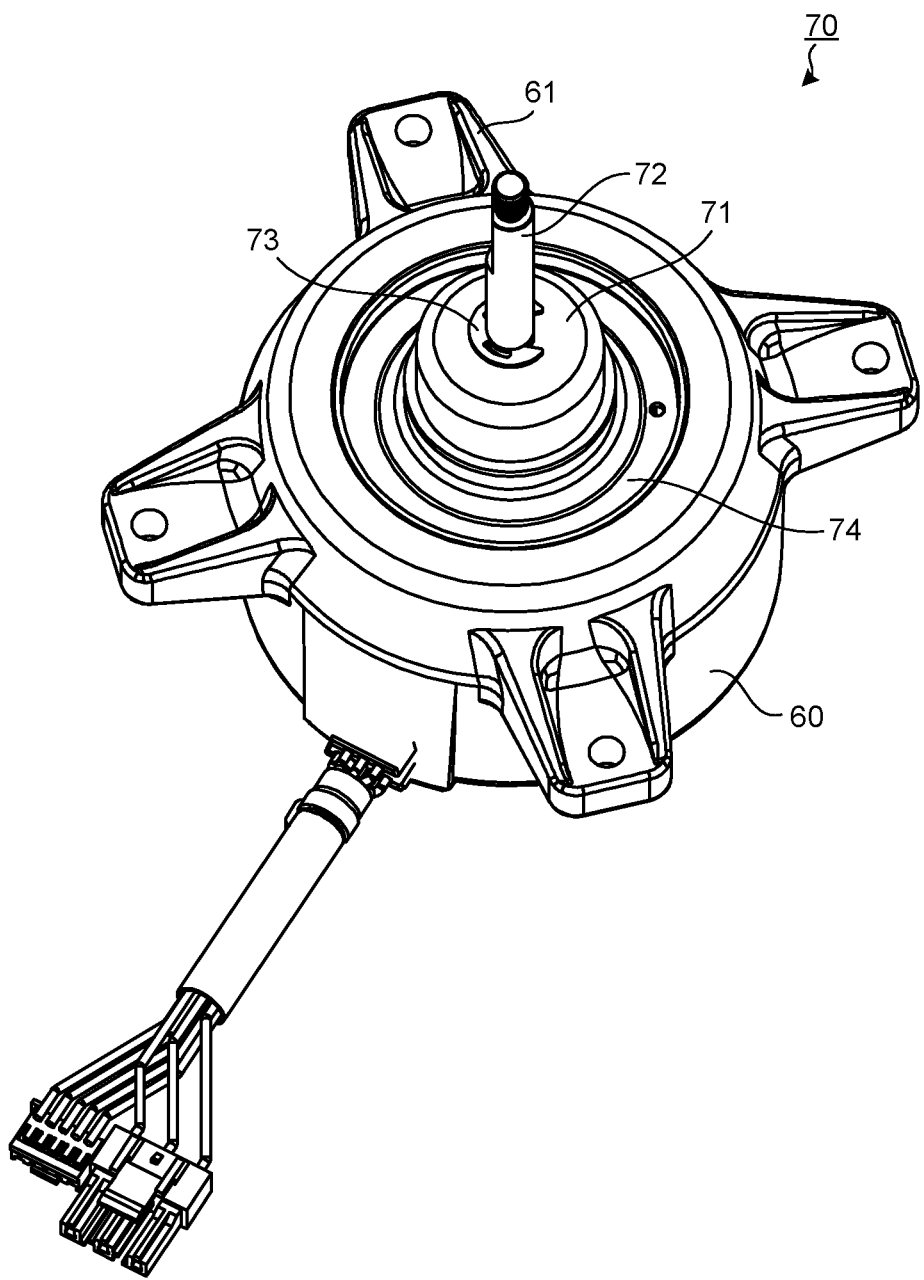
FIG. 13 is a perspective view of a molded electric motor.
Figure 14:
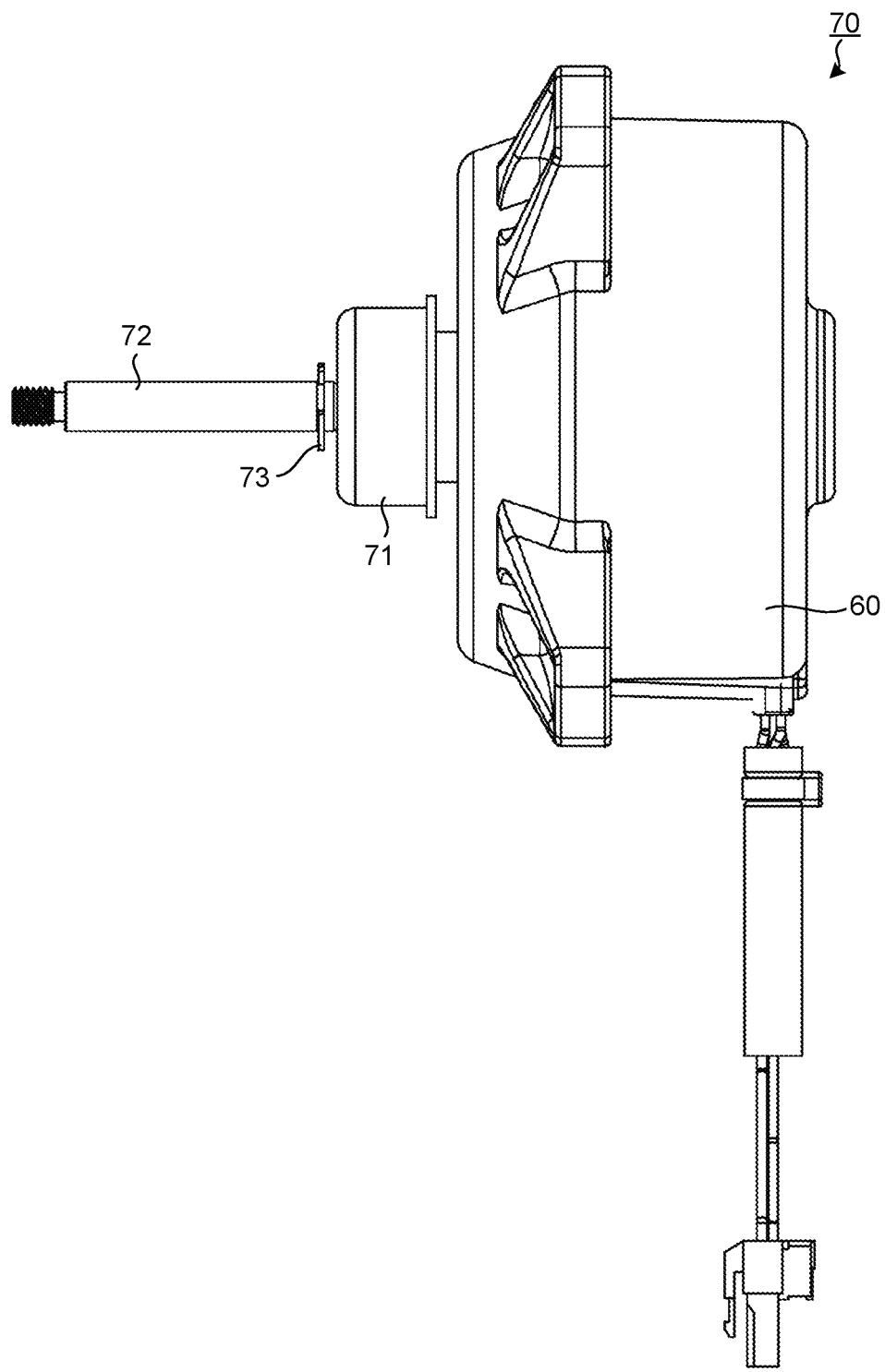
FIG. 14 is a side view of the molded electric stator.
Figure 15:
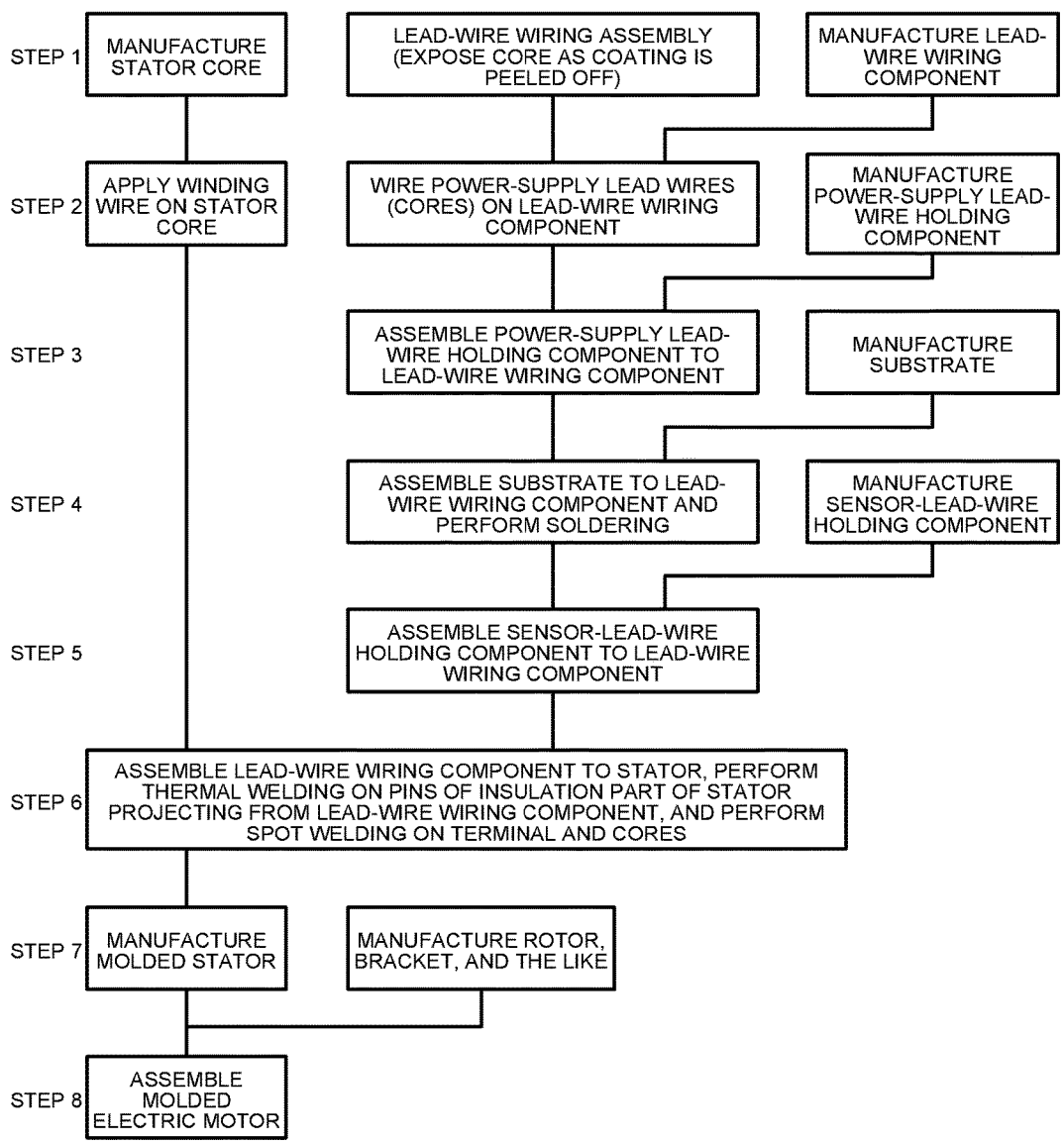
FIG. 15 is a diagram illustrating a manufacturing process of the molded electric motor.
Figure 16:
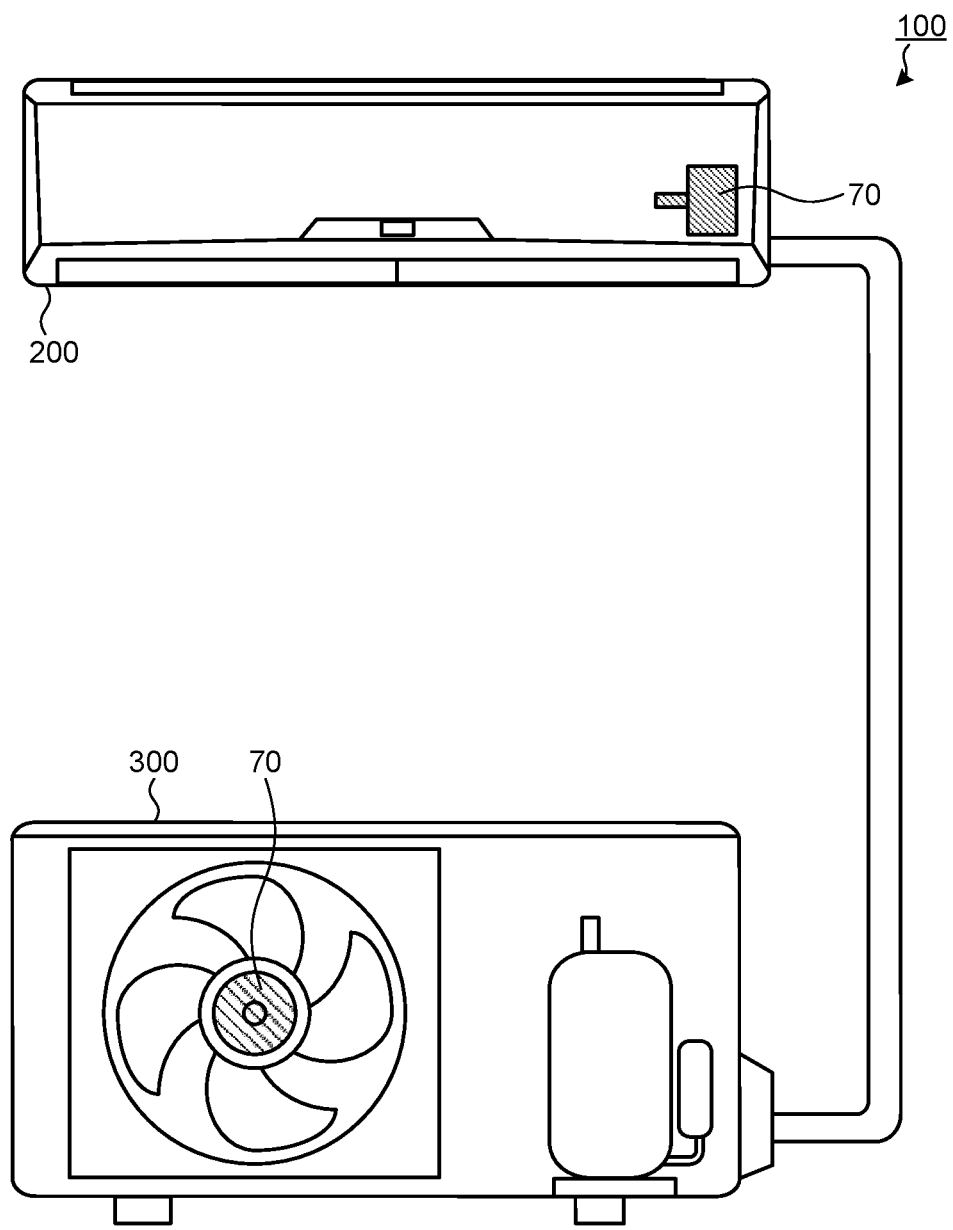
FIG. 16 is a configuration diagram of an air conditioner having a molded electric motor incorporated therein.

FIG. 1 is a perspective view of a stator assembly of an electric motor according to an embodiment of the present invention as viewed from a substrate side. FIG. 2 is a perspective view of a lead-wire wiring component illustrated in FIG. 1. FIG. 3 is a perspective view of the lead-wire wiring component illustrated in FIG. 2 as viewed from a rear surface (an opposite surface). FIG. 4 is an enlarged view of a lead-wire terminal holding unit included in the lead-wire wiring component illustrated in FIG. 2. FIG. 5 is an enlarged view of a lead-out component included in the lead-wire wiring component illustrated in FIG. 2 and the periphery of the lead-out component. FIG. 6 is an enlarged view of a substrate holding unit included in the lead-wire wiring component illustrated in FIG. 2 and the periphery of the substrate holding unit. FIG. 7 is an enlarged view of the substrate holding unit and the periphery thereof as viewed from a direction different from that of FIG. 6. FIG. 8 is a perspective view of a sensor substrate. FIG. 9 is a perspective view of a lead-wire wiring component in a state where power-supply lead wires are in place. FIG. 10 is a perspective view of a power-supply lead-wire holding unit. FIG. 11 is a perspective view of a sensor-lead-wire holding unit. FIG. 12 is a perspective view of a molded stator. FIG. 13 is a perspective view of a molded electric motor. FIG. 14 is a side view of the molded electric stator. FIG. 15 is a diagram illustrating a manufacturing process of the molded electric motor. FIG. 16 is a configuration diagram of an air conditioner having a molded electric motor incorporated therein.

A stator assembly 30 illustrated in FIG. 1 includes a ring-shaped stator 10; a lead-wire wiring component 1 that is assembled to the stator 10 at one end of the stator 10 in its axial direction; a substrate 11 that is assembled to the lead-wire wiring component 1; and a lead-wire wiring assembly 40.

The stator 10 includes a stator core 82 that is formed by punching through electromagnetic steel plates in a belt shape and laminating these plates in the axial direction of a shaft 72 (see FIG. 13) of a rotor (not illustrated) by using a method such as caulking, welding, or bonding; an insulation part 83; and a winding wire 84 that is formed by having a magnetic wire wound around the insulation part 83.

The insulation part 83 is formed by integrally molding thermoplastic resin such as PBT (polybutylene terephthalate) with the stator core 82, or is formed by being assembled to the stator 10 after being molded. A plurality of pins 81 projecting towards the side of the substrate 11 and a plurality of terminals 12 to which power from outside is supplied are provided on the insulation part 83.

One of terminals of the magnetic wire is drawn to a hook part 85 of the terminal 12, and it is bonded to the hook part 85 by using a method such as fusing or soldering. Terminals other than the one terminal are bundled for each phase and form a neutral point.

In the following descriptions, an end-face outer side in the axial direction of the stator core 82, i.e., the side on which the terminal 12 is provided, is referred to as "wire-connection side"; and the side opposite thereto is referred to as "non wire-connection side".

An insulation outer wall 83a that constitutes the insulation part 83 prevents the winding wire 84 from coming away towards the outer periphery side of the stator core 82. The plurality of pins 81 for attaching the lead-wire wiring component 1 to the stator 10 is provided on an end part on the wire-connection side of the insulation outer wall 83a in the axial direction.

An insulation inner wall 83b that constitutes the insulation part 83 prevents the winding wire 84 from coming away towards the inner periphery side of the stator core 82. On an end part on a non wire-connection side of the insulation inner wall 83b in the axial direction, a projection (not illustrated) that is used, when the stator assembly 30 is molded, as a stopper for a mold core metal part in the axial direction is provided.

The height of the end part of the insulation outer wall 83a in the axial direction is formed to be slightly larger than the maximum height of the winding wire 84 in the axial direction. Further, the winding wire 84 is formed such that the height thereof in its axial direction becomes lower as the winding wire approaches from the insulation outer wall 83a to the insulation inner wall 83b. In this configuration, when the height of a projection (not illustrated) of the insulation inner wall 83b on the non wire-connection side is set to be the same as the height of the end part of the insulation outer wall 83a in the axial direction, a sufficient distance from the stator 10 to the winding wire 84 can be maintained. Therefore, when the stator 10 is placed on the mold core metal part in a state where the non wire-connection side of the stator 10 is put face down, the stator 10 can be placed stably while the winding wire 84 does not contact the mold core metal part. As a result, productivity of the stator 10 is improved and the quality thereof is also improved.

The lead-wire wiring assembly 40 is configured to include power-supply lead wires 8 that supply power to the winding wire 84, sensor lead wires 7, and a board-in connector 80 that is connected to terminals of the sensor lead wires 7. The board-in connector 80 is connected to, among the terminals of the sensor lead wires 7, a terminal on the side that becomes the inside of a mold when the stator 10 is molded.

Electronic components such as Hall ICs 34 are mounted on the substrate 11 as position detection circuits of a rotor (see FIG. 8). The board-in connector 80 is placed on a side surface of the substrate 11 on a side opposite to the stator, and a terminal (not illustrated) provided on the board-in connector 80 is exposed to a side surface of the substrate 11 on a stator side via a terminal insertion hole (not illustrated) formed on the substrate 11. The terminal insertion hole is connected to a wiring pattern on the substrate 11. Therefore, as the terminal provided on the board-in connector 80 is solder-bonded to the terminal insertion hole, the sensor lead wires 7 are electrically connected to the electronic components on the substrate 11.

The sensor lead wires 7 and the power-supply lead wires 8 are wired using the lead-wire wiring component 1. Further, the positional relation between the sensor lead wires 7 and the power-supply lead wires 8 and the lead-wire wiring component 1 is maintained by a lead-wire lead-out unit 2 (see FIG. 1) that is constituted by a power-supply lead-wire holding component 4 (see FIG. 10), a sensor-lead-wire holding component 5 (see FIG. 11), and a lead-out component 6 (see FIG. 5).

The lead-wire wiring component 1 is described next. The lead-wire wiring component 1 is molded to become substantially a donut shape using thermoplastic resin such as PBT (polybutylene terephthalate) (see FIG. 2). As illustrated in FIG. 2, a plurality of attachment legs to be attached to the stator 10 is provided on the outer periphery of the lead-wire wiring component 1. Each of the attachment legs 13 has a hole 13a into which the pin 81 for attaching a lead-wire wiring component provided on the insulation part 83 of the stator 10 is inserted. When the lead-wire wiring component 1 is assembled to the stator 10, positioning in the axial direction is realized as the attachment legs 13 abut on a placement surface of wiring components of the insulation part 83 of the stator 10. At this time, positioning in a rotating direction of the lead-wire wiring component 1 is realized as the pin 81 of the insulation part 83 is inserted into the hole 13a of the attachment leg 13. In a state where the positioning is completed, i.e., in a state where the pin 81 of the insulation part 83 is inserted into the hole 13a of the attachment leg 13, the lead-wire wiring component 1 and the stator 10 are fixed by, for example, welding the pin 81 to the hole 13a with ultrasonic welding.

The lead-wire wiring component 1 includes a wall part 16 having a predetermined height and a predetermined width from the attachment legs 13, which are adjacent to the lead-wire lead-out unit 2 (see FIG. 1) placed on the radially outer side of the stator 10, towards the lead-wire lead-out unit 2. When the lead-wire wiring component 1 is assembled to the stator 10, the wall part 16 has, on the radially outer side thereof, a plane surface that becomes substantially perpendicular to the radial direction of the stator (a direction advancing towards the center axis of the stator 10). As the lead-wire wiring component 1 includes the wall part 16, because ultrasonic welding is used for fixing the stator 10 and the lead-wire wiring component 1 to each other, it is possible to prevent the pin 81 of a melted insulation part 83 from flowing to a radially outward direction. As a result, it is possible to prevent the pin 81 of the melted insulation part 83 from being exposed to the outside of the molded stator, and thus improvement in quality thereof can be achieved. Further, when the stator 10 is molded, the flow of resin around the lead-wire lead-out unit 2 is aligned, and the resin pressure applied on the lead-wire lead-out unit 2 can be further increased, so improvement in the quality of the molded stator can be achieved. In addition, when a lead-wire is being assembled, the wall part 16 can be also used for positioning of jigs, and the operation of assembling the lead-wire can be improved.

Wiring of the power-supply lead wire 8 is described here. The power-supply lead wires 8 are guided to the terminals 12 of the stator 10 along the lead-wire wiring component 1 via the lead-wire lead-out unit 2. That is, each of three-phase power-supply lead wires constituting the power-supply lead wires 8 are drawn to the terminals 12 of the stator 10 that are placed with an angle of 120° to one another. The three-phase power-supply lead wires are positioned by abutting terminals, from which a coating thereof is peeled off, to a wall of a lead-wire-terminal holding unit 14; and when the lead-wire wiring component 1 is assembled to the stator 10, the three-phase power-supply wires are drawn along a surface (a lead-wire wiring surface 21) on the side of the stator 10 of the lead-wire wiring component 1 and a wall (a wall 22) provided on the inner periphery (see FIG. 3). A plurality of projections 22a for preventing positional deviation of the power-supply lead wires 8 is provided on the wall 22. Further, the power-supply lead wires 8 are bent at lead-wire folding pins 27 provided in the vicinity of the lead-out component 6 in the direction of the lead-out component 6 to be drawn and are fitted and held in a power-supply lead-wire holding projection (not illustrated) provided in the vicinity of the lead-out component 6. The lead-wire folding pins 27 are projections that also function to prevent positional deviation of lead wires.

Among three lead-wire folding pins 27, two lead-wire folding pins 27 at both ends are formed to have a height that is larger for a predetermined size than the height of the lead-wire folding pin 27 at the center. With this configuration, positional deviation of the power-supply lead wires in the axial direction in the vicinity of the lead-wire lead-out unit can be prevented, which can lead to improvements in product quality.

Three power-supply lead wires 8 are drawn to respective different lead-wire-terminal holding units 14 via a power-supply lead-wire holding unit, which is formed with the lead-out component 6 and the power-supply lead-wire holding component 4 provided at a lower stage of the lead-out component 6. The power-supply lead wire 8 that is drawn to a lead-wire-terminal holding unit 14 (a first lead-wire-terminal holding unit) that is furthest away from the lead-out component 6 is drawn to a central groove (see FIG. 3) provided in the lead-out component 6, and it is then drawn to the first lead-wire-terminal holding unit. The power-supply lead wires 8 wired on lead-wire-terminal holding units 14 (second lead-wire-terminal holding units) on both sides of the lead-out component 6 are respectively drawn to outer-side grooves (see FIG. 3) provided in the lead-out component 6, and they are further drawn to the second lead-wire-terminal holding units. In this case, either one of the two power-supply lead wires 8 wired on the second lead-wire-terminal holding units is drawn on the outer side of the power-supply lead wire 8 that is wired on the first lead-wire-terminal holding unit (see FIG. 9). FIG. 9 is a diagram illustrating the lead-wire wiring component 1 (on a stator side) in a state where the power-supply lead wires 8 are drawn.

Cores of the power-supply lead wires 8 of which coatings are peeled off are held in a core holding unit 24 that is a predetermined distance away from respective lead-wire-terminal holding units 14 in a manner that the terminals 12 of the stator 10 and the cores come close to each other when the stator 10 is assembled to the lead-wire wiring component 1 (see FIG. 4).

Concave parts 23 for electrode clearance are provided on the lead-wire wiring component 1 in order to secure a space for an electrode that sandwiches the terminals 12 and cores. The space for the electrode to sandwich the terminals 12 and cores becomes necessary in order to perform an operation of spot welding the cores and the terminals 12. This operation is performed after assembling the lead-wire wiring component 1 to the stator 10. By providing the concave parts 23, the power-supply lead wires 8 are drawn on a side much closer to the stator 10 with respect to the lead-wire wiring surface 21 of the lead-wire wiring component 1 (see FIG. 3). Further, positional-deviation prevention projections 25 are provided in the vicinity of the concave parts 23 to provide electrode clearance. By providing the positional-deviation prevention projections 25, the positioning of the power-supply lead wires 8 in the axial direction is realized.

As illustrated in FIG. 2, the lead-wire wiring component 1 includes, on a surface on the side opposite to the stator, a plurality of mounts 19, each having a substantially trapezoidal shape. End faces on the side opposite to the stator of these mounts 19 abut on a die when molding is performed, and thus positioning of the stator assembly 30 in the axial direction can be made. Further, as the mounts 19 are formed to have a trapezoidal shape, the area of each of the mounts 19 to be exposed to outside of the molded stator can be reduced, and thus the buckling strength of the mounts 19 can be improved.

Furthermore, the lead-wire wiring component 1 includes a positioning part 18 that is used for positioning when having been molded after the lead-wire wiring component 1 is attached to the stator 10 (see FIGS. 2 and 3). The positioning part 18 is positioned on the inner side more inwardly than the inner diameter of the stator 10 in a state where the lead-wire wiring component 1 is attached to the stator 10 and these elements are formed as the stator assembly 30, and it is placed at a predetermined position corresponding to a pin or a projection projecting from a center shaft and a realizing positioning of a molding die in the radial direction. The positioning part 18 includes an insertion hole 18a, and it marks the positioning of the stator assembly 30 in a rotating direction by inserting a pin or a projection projecting from the center shaft and marking the positioning of the molding die in the radial direction into the insertion hole 18a. This time, the lead-out component 6 to be fixed to the molding die and lead wires (the sensor lead wires 7 and the power-supply lead wires 8) of the stator assembly 30 are positioned on a substantially same straight line. As these elements are positioned on substantially the same line, it is possible to prevent occurrence of a state where the stator 10 is set in the molding die while being deviated to the rotating direction and the angle thereof with respect to the lead-out component 6 is deviated, and it is further possible to reduce a load to be applied on a soldered part of the substrate 11 due to extension of the sensor lead wires 7. The positioning part 18 also functions as a rotation stopper when a force in the rotating direction is applied on the stator 10 due to resin pressure during molding.

The positioning part 18 may be provided on a donut-shaped main unit 1a of the lead-wire wiring component 1, or it may be provided by being connected from the main unit 1a as illustrated in FIGS. 2 and 3. When the positioning part 18 is provided by being connected from the main unit 1a, because the part thereof from the main unit 1a of the lead-wire wiring component 1 to the positioning part 18 is formed in a thin and connected shape, it is possible to prevent the positioning part 18 from being deformed by the resin pressure during molding, and it is possible to reduce exposure of the positioning part 18 to the mold inner diameter side, thereby achieving improvement in quality.

The positioning part 18 of the lead-wire wiring component 1 includes, on the non wire-connection side (the stator side), a projection 18b having a predetermined height that realizes positioning of a molding die in the radial direction and that abuts on an end face of a center shaft in the axial direction (see FIG. 3). As the positioning part 18 includes the projection 18b, when being molded, the projection 18b abuts on an end face of the center shaft in the axial direction, and positioning in the axial direction is realized. Accordingly, it is possible to reduce the occurrence of a state where the positioning part 18 is deformed due to resin pressure during molding and the positioning part 18 is exposed to the mold inner diameter side, thereby achieving improvement in quality.

The positioning part 18 of the lead-wire wiring component 1 is provided at a position opposing to substrate holding units 15, which is described later. For example, when a molded electric motor that is configured to include the stator assembly 30 according to the present embodiment is placed to be in the axially level with respect to an outdoor unit of an air conditioner, the lead-out component 6 is attached to a lower side of the outdoor unit as a measure against the ingress of fluid into the molded electric motor. In this case, the positioning part 18 is placed on an upper side of the outdoor unit, so that, when fluid enters the inside of the molded electric motor, it is possible to reduce the ingress of fluid from a surface contacting a center shaft of a molding die during molding, thereby achieving improvement in quality.

In the inner periphery side of the stator 10 of the lead-wire wiring component 1, the substrate holding units 15, each of which has a claw 31 and a groove 32 for assembling the substrate 11, are provided (see, for example, FIGS. 3, 6, and 7). The substrate 11 having a position detection circuit of a rotor mounted thereon is assembled to each of the substrate holding units 15 (see FIG. 8). As illustrated in FIG. 8, the substrate 11 has a substantially rectangular shape from which corners on a diagonal line are chamfered. The substrate 11 has grooves 35 for latching the lead-wire wiring component 1 on one of long sides thereof; and on the other long side, the substrate 11 has notches 36, from which a part thereof is further notched so that the notches function as positioning parts when assembling the substrate 11 to the lead-wire wiring component 1.

Each of the substrate holding units 15 of the lead-wire wiring component 1 has the claw 31 that is latched to the groove 35 of the substrate 11 and the groove 32 in which a long side of the substrate 11, from which a part thereof is notched, is fitted when assembling the substrate 11 to the lead-wire wiring component 1. Due to the fitting between the notches 36 of the substrate 11 and the groove 32 of the substrate holding units 15, deviation and deformation of the lead-wire wiring component 1 and the substrate 11 due to molding pressure during molding can be reduced, thereby achieving improvement in the quality of the molded electric motor. Further, by assembling the substrate 11 to the lead-wire wiring component 1 while inserting a long side of the substrate 11, from which a part thereof is notched, into the groove 32 provided on the substrate holding units 15 of the lead-wire wiring component 1, therefore, the substrate 11 can be easily assembled to the lead-wire wiring component 1. With to the configuration described above, it is not necessary to provide unnecessarily large positioning parts on the substrate 11, and thus the area of the substrate 11 can be downscaled, the production number of substrates 11 can be increased, and cost of the electric motor can be reduced.

When manufacturing, after the substrate 11 is assembled to the lead-wire wiring component 1, the substrate 11 and the board-in connector 80 of the sensor lead wires 7 are bonded to each other by soldering. The sensor lead wires 7 are drawn towards the lead-out component 6, which is the surface opposite to the surface on which power-supply lead wires of the lead-out component 6 are wired.

As illustrated in FIGS. 2 and 5, the claw 31 used to assemble the substrate 11 is connected to the donut-shaped main unit 1a of the lead-wire wiring component 1 with a plurality of thin connection parts 28. Therefore, the molding pressure on the substrate 11 during molding can be dispersed.

Each of the thin connection parts 28 includes a projection 29 formed to project to the side opposite to the stator, and because the projection 29 abuts on a molding die during molding, positioning and deviation prevention of the substrate 11 in the axial direction can be realized (see FIGS. 2 and 5).

As illustrated in FIG. 5, the lead-out component 6 includes projections 17, as plane parts, extending in a circumferential direction for a predetermined length from a circumferential-direction terminal to the lead-wire wiring component 1. When the lead-wire wiring component 1 is assembled to the stator 10, the projections 17 have a plane surface that is substantially perpendicular to a radial direction of a stator (a direction advancing towards the central axis of the stator 10) on a radially outer side. The plane surface is provided on the outer side in the radial direction. By providing the projections 17, the projected area of the lead-out component 6 in the radial direction is increased, and molding pressure in the radial direction applied on the lead-out component 6 during molding is also increased. As the molding pressure in the radial direction is increased, wiring components are pressed in the radial direction with a force greater than that associated with conventional technology. As a result, positioning in the radial direction can be realized while the lead-out component 6 abuts on a molding die.

Furthermore, the lead-out component 6 includes two types of latching parts that hold lead-wire holding components, which are latching parts 26a that hold the power-supply lead-wire holding component 4 and latching parts 26b that hold the sensor-lead-wire holding component 5. The projections 17 described above are connected to the latching parts 26b.

The power-supply lead-wire holding component 4 illustrated in FIG. 10 includes legs 41 that are hooked on the latching parts 26a of the lead-out component 6 and a rib 42, and projections 41a are provided on the tip end of each of the legs 41. As the projections 41a abut on the latching parts 26a, positioning of the power-supply lead-wire holding component 4 in the axial direction is realized. After the power-supply lead wires 8 are wired to the lead-out component 6, each of the legs 41 is latched to the corresponding one of the latching parts 26a of the lead-out component 6, and then the power-supply lead-wire holding component 4 is assembled to the lead-out component 6. When the power-supply lead-wire holding component 4 is latched to the lead-out component 6, as the rib 42 abuts on the lead-out component 6, it is possible to reduce the size of an opening of the power-supply lead wires 8 that is exposed to the outer side of the lead-wire lead-out unit 2. Further, notches 41b are provided on a side opposite to the projections 41a of the legs 41. When the power-supply lead-wire holding component 4 is latched to the lead-out component 6, each of the notches 41b advances beyond the lead-out component 6 to reach the side of the sensor-lead-wire holding component 5, and then each of the notches 41b functions as a guide to maintain the positions in the circumference direction of two sensor lead wires 7 wired on the outer side of the lead-out component 6 among a plurality (five) of sensor lead wires 7.

The sensor-lead-wire holding component 5 illustrated in FIG. 11 includes L-shaped legs 51 that are hooked on the latching parts 26b of the lead-out component 6. After the sensor lead wires 7 are wired on the lead-out component 6, the sensor-lead-wire holding component 5 is latched and assembled to corresponding one of the latching parts 26b of the lead-out component 6.

In the stator assembly 30 according to the present embodiment, the sensor lead wires 7 and the power-supply lead wires 8 are drawn on both sides of the lead-wire wiring component 1. That is, the sensor lead wires 7 are drawn on the surface on the side opposite to the stator (the side illustrated in FIG. 2) of the lead-wire wiring component 1, and the power-supply lead wires 8 are drawn on the surface of the stator side (the side illustrated in FIG. 3) of the lead-wire wiring component 1. With this configuration, assembling is facilitated and cost reduction of the assembling can be achieved, and improvement in quality is also achieved along with the facilitation of the assembling. Further, because the power-supply lead wires 8 are held by the projections 22a provided on the surface on the stator side to prevent positional deviation thereof in the axial direction, improvement in quality can be achieved.

Furthermore, the lead-wire wiring component 1 includes two types of latching parts, which are the latching parts 26a and 26b, where the latching parts 26a hold the power-supply lead wires 8 and the latching parts 26b hold the sensor lead wires 7. Therefore, it becomes possible to firmly assemble the respective lead wires to the lead-wire wiring component 1, thereby achieving improvement in quality along with reliability improvement. Further, as the legs 41 (the notches 41b) of the power-supply lead-wire holding component 4 are used also to hold the sensor lead wires 7, assembling is facilitated and cost reduction is achieved. In addition, improvement in quality is achieved along with the facilitation of the assembling.

When the lead-wire wiring component 1 on which the sensor lead wires 7 and the power-supply lead wires 8 are wired with the above configuration is assembled to the stator 10, and the pins 81 of the insulation part 83 of the stator 10 projecting from the attachment legs 13 of the lead-wire wiring component 1 are fixed by application of welding such as thermal welding or ultrasonic welding, the stator assembly 30 to which the sensor lead wires 7 and the power-supply lead wires 8 are assembled is obtained (see FIG. 1).

Furthermore, as the stator assembly 30 illustrated in FIG. 1 is molded from mold resin made of thermosetting resin such as BMC (bulk molding compound), a molded stator 60 illustrated in FIG. 12 is obtained. Further, as a rotor (not illustrated) and a bracket 74 are incorporated in an opening 62 of the molded stator 60, a molded electric motor 70 illustrated in FIGS. 13 and 14 is obtained.

Because the lead-wire wiring component 1 and the lead-out component 6 are provided as separated components and are positioned with a certain distance therebetween, the wall part 16 provided on the lead-wire wiring component 1 and the projections 17 provided on the lead-out component 6 are also separated from each other. Therefore, it is possible to reduce ingress of fluid flowing on an interface between the lead-wire lead-out unit 2 and mold resin, thereby achieving improvement in the quality of the stator 10.

When the molded stator 60 is mold, the lead-wire lead-out unit 2 of the stator assembly 30 is pushed out to the radially outer side from the center of the stator 10 due to the pressure of the mold forming. Therefore, the position of the lead-wire lead-out unit 2 is maintained without contacting the stator core 82. Accordingly, during molding, the respective lead wires are not fixed in a state where these wires contact one another, and any gap at a part where the respective lead wires contact one another is not generated. Therefore, there is no possibility that fluid having entered from a gap or an interface between the lead-wire lead-out unit 2 and mold resin flows through a gap between the respective lead wires and then reaches the substrate 11. As a result, improvement in the quality of the molded stator 60 can be achieved.

Further, when the stator 10 is placed in a molding die, projections (not illustrated) formed on the non wire-connection side of the insulation inner wall 83b are supported by a placing part formed in the molding die. For example, the placing part is constituted by a stepped part having an outer diameter slightly larger than the dimension of the inner diameter of the stator core 82, a plurality of claws extending in a projecting manner from a placing surface of an opening part of a mold core metal part to the side of the stator 10, or a plurality of projections extending in a state where the projections are not connected to the inner diameter of the stator core 82 from a bracket placing surface in the vicinity of the mold core metal part.

In this manner, because the stator 10 is supported by a placing part of a die, it is not necessary to support the outer periphery part of the stator 10 during molding by a die (a regulating member). Therefore, on the outer frame of the molded stator 60, any border surface between the stator core 82 and mold resin is not formed.

Furthermore, when the stator 10 is supported by projections of a die, even when the molded stator 60 is placed in the die, projections (not illustrated) formed on the non wire-connection side of the insulation inner wall 83b are not exposed on the inner diameter side of the stator core 82, and the effect of reducing ingress of fluid can be further improved.

In FIGS. 13 and 14, the shaft 72 of a rotor, a waterproof cap 71, and an E-ring 73 are assembled in the molded stator 60 using the bracket 74. The waterproof cap 71 is used to prevent ingress of water from a gap between the shaft 72 and the bracket 74. With this configuration, the molded electric motor 70 having good productivity and good quality due to the good productivity and being capable of achieving cost reduction is obtained.

Next, manufacturing steps of the molded electric motor 70 are described with reference to FIG. 15.
(1) Step 1: The stator core 82 is manufactured. At the same time, the lead-wire wiring assembly 40 and the lead-wire wiring component 1 are manufactured.
(2) Step 2: The winding wire 84 is applied on the stator core 82. At the same time, the power-supply lead wires 8 of the lead-wire wiring assembly 40 are wired on the lead-wire wiring component 1. At this time, cores of the power-supply lead wires 8 are drawn to the core holding unit 24. At the same time, the power-supply lead-wire holding component 4 is manufactured.
(3) Step 3: The power-supply lead-wire holding component 4 is assembled to the lead-wire wiring component 1. At the same time, the substrate 11 is manufactured.
(4) Step 4: The substrate 11 is assembled to the lead-wire wiring component 1. A terminal of the board-in connector 80 is soldered on the substrate 11 having been assembled to the substrate holding unit 15. At the same time, the sensor-lead-wire holding component 5 is manufactured.
(5) Step 5: The sensor-lead-wire holding component 5 is assembled to the lead-wire wiring component 1.
(6) Step 6: The lead-wire wiring component 1 is assembled to the stator 10, the pins 81 projecting from the attachment legs 13 of the lead-wire wiring component 1 are thermally welded, and the terminal 12 of the stator 10 and cores of the power-supply lead wires 8 are spot-welded to each other.
(7) Step 7: The stator assembly 30 is molded to manufacture the molded stator 60. At the same time, components such as a rotor and the bracket 74 are manufactured.
(8) Step 8: The molded electric motor 70 is manufactured as components such as a rotor are assembled to the molded stator 60.

FIG. 16 illustrates an air conditioner 100 having the molded electric motor 70 according to the present embodiment incorporated therein. The air conditioner 100 includes an indoor device 200 and an outdoor device 300 that is connected to the indoor device 200. The molded electric motor 70 as a drive source of an air blower is provided in each of the indoor device 200 and the outdoor device 300. When the molded electric motor 70 is placed in the indoor device 200 and the outdoor device 300, a plurality of attachment legs 61 (see FIG. 12) extending towards the radially outer side from the outer periphery side of the molded stator 60 are used. By using the molded electric motor 70 in this manner as an electric motor for an air blower, being a main component of the air conditioner 100, ingress of fluid into the inside of a stator of the electric motor for an air blower is reduced, and the air conditioner 100 with low cost and high quality can be obtained.

As described above, the molded stator 60 according to the present embodiment includes the substrate 11 having electronic components constituting a position detection circuit of a rotor mounted thereon, the lead-wire wiring component 1 having the power-supply lead wires 8 that supply power to the winding wire 84 of the stator 10 and the sensor lead wires 7 that are connected to the substrate 11 mounted thereon, the lead-out component 6 that is placed on the radially outer side of the lead-wire wiring component 1 and leads out lead wires to outside of the molded stator 60, the power-supply lead-wire holding component 4 that is assembled to the lead-out component 6 to hold the power-supply lead wires 8, and the sensor-lead-wire holding component 5 that is assembled to the lead-out component 6 to hold the sensor lead wires 7. The lead-out component 6 includes the projections 17 for increasing a projected area of the lead-out component 6 in a radial direction. With this configuration, molding pressure applied on the lead-out component 6 during molding the molded stator 60 is increased, so that the lead-out component 6 is pressed in the radial direction with a greater force to abut on a molding die, thereby realizing positioning in the radial direction.

Furthermore, because the lead-wire wiring component 1 includes the wall part 16 having a predetermined height and a predetermined width from the attachment legs 13, which are adjacent to the lead-out component 6 placed on the radially outer side of the stator 10, to the lead-out component 6, the flow of resin around the lead-out component 6 during molding the molded stator 60 is aligned. As a result, the force applied to the molded stator 60 can be further strengthened, and the positioning accuracy of the lead-out component 6 in the radial direction is improved, and thus improvement in quality can be achieved. Further, because the wall part 16 is provided, when an ultrasonic welding is operated for fixing the stator 10 and the lead-wire wiring component 1 to each other, it is possible to reduce exposure of a melted insulation part (the pin 81) to outside of the molded stator 60, and thus improvement in quality can be achieved. In addition, because the wall part 16 can be also used for positioning of jigs when assembling the lead-wire, operability of lead-wire assembling can be improved.

Further, in the lead-out component 6, because the projections 17 extending in a circumferential direction for a predetermined length from a circumferential-direction terminal to the lead-wire wiring component 1 are away from the wall part 16 of the lead-wire wiring component 1 for a predetermined distance, it is possible to reduce occurrence of a state where fluid enters from the lead-out component 6, flows on an interface between a resin part and mold, and the fluid having entered the inside of the lead-out component 6 reaches the substrate 11, and thus resistance to ingress of fluid can be improved.

The molded stator according to the embodiment of the present invention is only an example of the contents of the present invention. The molded stator can be combined with other well-known techniques, and it is needless to mention that the present invention can be configured while modifying it without departing from the scope of the invention, such as omitting a part of the configuration.

INDUSTRIAL APPLICABILITY

As described above, the present invention is useful as a molded stator, a molded electric motor, and an air conditioner.

REFERENCE SIGNS LIST 1 lead-wire wiring component, 1a main unit, 2 lead-wire lead-out unit, 4 power-supply lead-wire holding component, 5 sensor-lead-wire holding component, 6 lead-out component, 7 sensor lead wire, 8 power-supply lead wire, 10 stator, 11 substrate, 12 terminal, 13 attachment leg, 13a hole, 14 lead-wire-terminal holding unit, 15 substrate holding unit, 16 wall part, 17, 18b, 29, 41a projection, 18 positioning part, 18a insertion hole, 19 mount, 21 lead-wire wiring surface, 22 wall, 23 concave part, 24 core holding unit, 25 positional-deviation prevention projection, 26a, 26b latching part, lead-wire folding pin, 28 thin connection part, 30 stator assembly, 31 claw, 32, 35 groove, 34 Hall IC, 36 notch, 40 lead-wire wiring assembly, 41, 51 leg, 42 rib, molded stator, 70 molded electric motor, 71 waterproof cap, 72 shaft, 73 E-ring, 74 bracket, 80 board-in connector, 81 pin, 82 stator core, 83 insulation part, 83a insulation outer wall, 83b insulation inner wall, 84 winding wire, 85 hook part, 100 air conditioner, 200 indoor device, 300 outdoor device.

The invention claimed is:

1. A molded stator including a stator and a substrate having a position detection circuit of a rotor mounted thereon and an outer frame thereof being formed from mold resin,
the molded stator comprising:
a donut-shaped lead-wire wiring component that
is attached to an end of the stator in the axial direction,
is configured to wire power-supply lead wires to a winding wire of the stator, and
is configured to wire sensor lead wires to the position detection circuit; and
a lead-out component that
is provided on a radially outer side of the lead-wire wiring component and
leads out the power-supply lead wires and the sensor lead wires to outside of the molded stator, wherein
the lead-out component includes a projection that has plane parts, on the radially outer side, that are substantially perpendicular to a radial direction of the stator, and
the lead-wire wiring component includes a plurality of mounts located on a radially inner end of an annular surface of the lead-wire wiring component on a side of the lead-wire wiring component opposite to the stator, the mounts extending in a trapezoidal shape toward the side opposite to the stator.

2. The molded stator according to claim 1, wherein
the lead-wire wiring component includes a plurality of attachment legs for attaching the lead-wire wiring component to the stator on an outer circumference thereof,
each of the attachment legs includes a hole through which a fixing pin provided in the stator is inserted, and
among the plurality of attachment legs, two attachment legs provided in the vicinity of both ends of the lead-out component respectively include a wall part.

3. The molded stator according to claim 2, wherein the plane parts are provided at a position away from the wall part.

4. A molded electric motor that uses the molded stator according to claim 1.

5. An air conditioner that includes the molded electric motor according to claim 4 incorporated therein as an electric motor for an air blower.

6. The molded stator according to claim 1, wherein
the lead-wire wiring component includes
at least one substrate holding unit on a radially inner side of the lead-wire wiring component, the at least one substrate holding unit is adapted to attach to the substrate.

7. The molded stator according to claim 2,
wherein the wall part is disposed at a radially outer end of the attachment leg, and
wherein the wall part projects in the direction that is substantially perpendicular to the radial direction of the stator.

* * * * *